(No Model.)

W. P. HOPKINS.
MANUFACTURING IRON.

No. 438,436. Patented Oct. 14, 1890.

Witnesses
F. C. Gibson
C. D. Davis

Inventor
Wm. P. Hopkins
By his Attorney
C. M. Alexander

UNITED STATES PATENT OFFICE.

WILLIAM P. HOPKINS, OF CATASAUQUA, PENNSYLVANIA.

MANUFACTURING IRON.

SPECIFICATION forming part of Letters Patent No. 438,436, dated October 14, 1890.

Application filed July 16, 1890. Serial No. 358,875. (No model.)

*To all whom it may concern:*

Be it known that I, WILLIAM P. HOPKINS, a citizen of the United States, residing at Catasauqua, in the county of Lehigh and State of Pennsylvania, have invented certain new and useful Improvements in Manufacturing Iron, of which the following is a specification, reference being had therein to the accompanying drawings.

Figure 1:
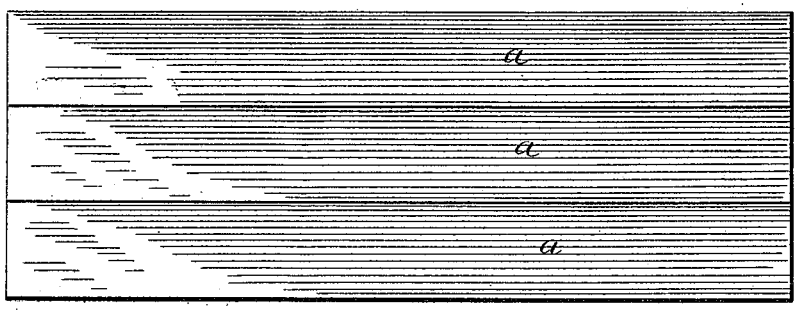
Figure 2:
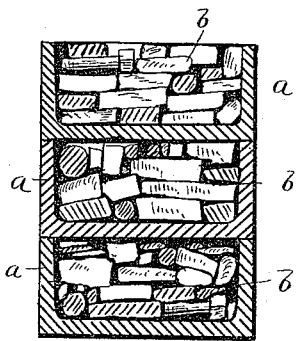

In the accompanying drawings, Figure 1 represents a side elevation of a portion of my improved pile, and Fig. 2 a transverse sectional view thereof.

The object of this invention is to produce refined guide-iron of the best quality at a minimum expense and at the same time utilize waste scrap-iron, as will more fully hereinafter appear.

The usual method of manufacturing bar or guide iron is to first roll the scrap or puddle-ball after leaving the squeezer into flat "muck" or scrap bars. Then cut these bars into shorter bars, then pile these cut bars and reheat them to a welding temperature, and finally roll these piled bars while hot into any desired shape and length. This method is obviously expensive and cumbersome, and it is the object of the present invention to overcome the objections to this method and produce a better grade of iron at the least possible cost.

In practicing my invention I roll the puddle-ball directly into channel-iron and then pile these channels one upon the other to a suitable height to suit the size of bar intended to be made, each channel-iron being filled with waste scrap-iron. The pile thus formed is reheated to a welding temperature and passed through rolls for the purpose of reducing it to the desired shape and size.

In the drawings, *a* designates the channel-irons, and *b* the scrap-iron filled in each trough or channel. By forming the bars channel shape and piling them one upon the other in the manner shown and described a solid pile is formed and all dirt excluded from the scrap-iron. By thus making the puddle-ball into channel-iron a saving is effected in the cost of production of the iron.

Having thus fully described my invention, what I claim, and desire to secure by Letters Patent, is—

1. The method described of manufacturing bar-iron, the same consisting in rolling channel-iron directly from the puddle-ball, piling said channel-irons one upon the other, and reheating and rolling the pile thus formed, substantially as and for the purpose described.

2. The pile herein described, consisting of the angle-shaped bars placed one upon the other and filled with scrap or waste iron, substantially as and for the purpose set forth.

3. The pile herein described, consisting of two or more channel-bars placed one on top of the other and filled with scrap-iron, the bottom of the upper bars serving to cover and exclude the dirt from the lower channels, substantially as described.

In testimony whereof I affix my signature in presence of two witnesses.

WILLIAM × P. HOPKINS.
his mark

Witnesses:
JOHN W. HOPKINS,
LEWIS P. HOPKINS.